D. B. RICE.
FRUIT KNIFE.
APPLICATION FILED MAR. 28, 1919.
1,326,373.
Patented Dec. 30, 1919.
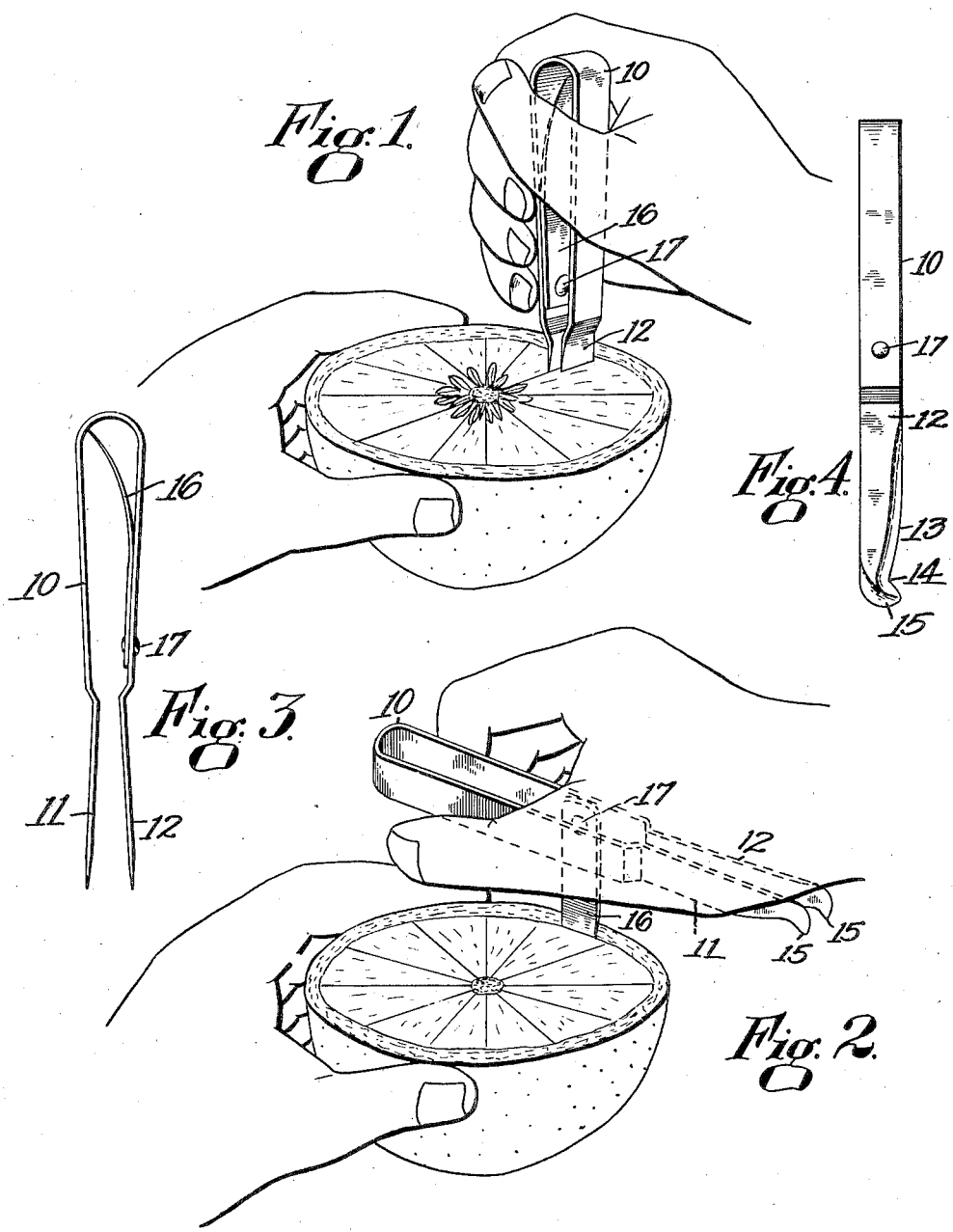
Inventor
David B. Rice
By his Attorneys
Southgate & Southgate

UNITED STATES PATENT OFFICE.

DAVID B. RICE, OF WORCESTER, MASSACHUSETTS.

FRUIT-KNIFE.

1,326,373.     Specification of Letters Patent.     Patented Dec. 30, 1919.

Application filed March 28, 1919. Serial No. 285,723.

*To all whom it may concern:*

Be it known that I, DAVID B. RICE, a citizen of the United States, residing at Worcester, in the county of Worcester and State of Massachusetts, have invented a new and useful Fruit-Knife, of which the following is a specification.

This invention relates to a fruit knife, particularly designed for cutting the pulp and removing the seeds from citrus fruits, such as oranges and grape-fruit.

It is the object of my invention to provide a fruit knife by which one or both of these operations may be more easily and quickly performed at a material saving of time and labor.

With this object in view, an important feature of my invention relates to the provision of a fruit knife having two cutting blades capable of being used simultaneously on opposite sides of a fruit partition.

Another important feature relates to the provision of a cutting blade or blades so shaped that it is also useful in removing the seeds from the fruit.

In one embodiment of my invention, my improved fruit knife comprises a handle, a pair of cutting blades fixed thereto, and a single curved blade pivoted to the handle and protected thereby when not in use.

My invention also relates to arrangements and combinations of parts hereinafter described and more particularly pointed out in the appended claims.

A preferred form of my invention is shown in the drawings, in which—

Figure 1 is a perspective view showing the fruit knife in use for cutting the pulp on opposite sides of a fruit partition;

Fig. 2 shows the knife in use for cutting the pulp around the inner surface of the rind;

Fig. 3 is a front elevation of my improved knife, and

Fig. 4 is a side view thereof.

Referring to the drawings, I have shown my improved knife as comprising a curved resilient handle portion 10 having cutting blades 11 and 12, preferably formed integrally therewith. These blades are provided with cutting edges 13 recessed at 14 to form hook-shaped outer end portions 15. A curved knife blade 16 is pivoted at 17 to the handle 10, and is disposed within the handle when not in use, the handle forming a guard therefor.

Methods of using my improved knife are indicated in Figs. 1 and 2, Fig. 1 showing the device in use for cutting the pulp simultaneously on opposite sides of a fruit partition. The knife is inserted at the outer end of the partition with the cutting edges 13 toward the center of the fruit. By moving the knife inward the pulp is severed on both sides of the partition. After the knife has reached its inmost position, it may be drawn upward, by which motion the hook-shaped ends 15 of the blades 11 and 12 are caused to engage and easily remove the seeds from the fruit. If it is thereafter desired to sever the pulp around the inside of the rind, the blade 16 is swung outward to the position indicated in Fig. 2, in which position it is well adapted for this operation.

Having thus described my invention and the methods of using the same, it will be seen that the time and labor involved in cutting the pulp in citrus fruits is greatly reduced by the use of my device which simultaneously cuts the pulp on opposite sides of a fruit partition. The blade 16 may be furnished or omitted as desired.

Having thus described my invention, it will be evident that changes and modifications can be made therein by those skilled in the art without departing from the spirit and scope of my invention as set forth in the claims, and I do not wish to be otherwise limited to the details herein disclosed, but what I claim is—

1. A fruit knife having in combination a U-shaped resilient handle and a pair of adjacent cutting blades forming extensions of said handle at the two ends thereof, said blades being relatively long and narrow and having cutting edges positioned on the same side of the knife, the distance between said blades being variable by pressure upon said handle.

2. A fruit knife formed of a single piece of material and comprising a U-shaped resilient handle and a pair of long narrow cutting blades forming continuations of said handle, said blades having cutting edges positioned on the same side of said knife and said cutting edges being recessed near their outer ends.

In testimony whereof I have hereunto affixed my signature.

DAVID B. RICE.